United States Patent
Rooyakkers et al.

(10) Patent No.: US 11,201,837 B2
(45) Date of Patent: Dec. 14, 2021

(54) COMMUNICATION NETWORK HOPPING ARCHITECTURE

(71) Applicant: Bedrock Automation Platforms, Inc., Mansfield, MA (US)

(72) Inventors: Albert Rooyakkers, Sunnyvale, CA (US); James G. Calvin, Attleboro, MA (US)

(73) Assignee: BEDROCK AUTOMATION PLATFORMS INC., San Jose, CA (US)

( * ) Notice: Subject to any disclaimer, the term of this patent is extended or adjusted under 35 U.S.C. 154(b) by 0 days.

(21) Appl. No.: 16/429,783

(22) Filed: Jun. 3, 2019

(65) Prior Publication Data
US 2019/0372912 A1    Dec. 5, 2019

Related U.S. Application Data

(63) Continuation of application No. 15/586,410, filed on May 4, 2017, now Pat. No. 10,313,273, which is a
(Continued)

(51) Int. Cl.
*H04L 12/947* (2013.01)
*H04L 12/931* (2013.01)
(Continued)

(52) U.S. Cl.
CPC ............ *H04L 49/25* (2013.01); *H04L 49/109* (2013.01); *H04L 49/1523* (2013.01); *H04L 49/351* (2013.01); *H04L 67/12* (2013.01)

(58) Field of Classification Search
CPC ..... H04L 49/1523; H04L 49/25; H04L 67/12; H04L 49/109; H04L 49/351; H04L 12/947; H04L 12/931; H04L 12/933; H04L 29/08
(Continued)

(56) References Cited

U.S. PATENT DOCUMENTS

| | | | | |
|---|---|---|---|---|
| 5,550,816 A | * | 8/1996 | Hardwick | .......... H04L 12/4604 370/397 |
| 6,414,958 B1 | * | 7/2002 | Specht | ................ G06Q 20/202 370/395.53 |

(Continued)

FOREIGN PATENT DOCUMENTS

| | | |
|---|---|---|
| JP | 2000049837 A | 2/2000 |
| JP | 2008072708 A | 3/2008 |
| JP | 2011120184 A | 6/2011 |

OTHER PUBLICATIONS

Extended European Search Report for Application No. 15155105.8 dated Apr. 22, 2015.
(Continued)

*Primary Examiner* — Man U Phan
(74) *Attorney, Agent, or Firm* — Kevin E. West; Advent, LLP

(57) ABSTRACT

Communication network systems are disclosed. In one or more implementations, the communication network system includes a plurality of network devices. Each of the plurality of network devices incorporates one or more multi-port switches, where each multi-port switch includes a connection to the network device incorporating the multi-port switch and a connection to at least one other port of another multi-port switch incorporated by another respective one of the plurality of network devices.

9 Claims, 5 Drawing Sheets

Related U.S. Application Data continuation of application No. 14/449,722, filed on Aug. 1, 2014, now Pat. No. 9,647,961.

(60) Provisional application No. 61/940,089, filed on Feb. 14, 2014.

(51) Int. Cl.
*H04L 12/933* (2013.01)
*H04L 29/08* (2006.01)

(58) Field of Classification Search
USPC .......................................................... 370/401
See application file for complete search history.

(56) References Cited

U.S. PATENT DOCUMENTS

| | | | | |
|---|---|---|---|---|
| 7,289,537 B1* | 10/2007 | Devanagondi | ........ | H04L 49/109 370/412 |
| 7,385,919 B2* | 6/2008 | Koestner | .................... | H04L 1/22 370/222 |
| 7,433,302 B2* | 10/2008 | Allen | ................ | H04L 12/40182 370/216 |
| 7,443,302 B2* | 10/2008 | Reeder | .................... | G16H 40/40 340/573.1 |
| 7,739,432 B1 | 6/2010 | Shaw et al. | | |
| 8,582,423 B2 | 11/2013 | Page et al. | | |
| 8,730,834 B2* | 5/2014 | Marusca | ............. | H04L 43/0817 370/254 |
| 8,817,611 B2* | 8/2014 | Kleineberg | ........... | H04L 12/437 370/230 |
| 8,842,664 B2 | 9/2014 | Wong | | |
| 8,886,746 B2* | 11/2014 | Batke | ................ | G05B 23/0267 709/217 |
| 8,964,772 B2 | 2/2015 | Woodruff | | |
| 8,964,795 B2* | 2/2015 | Manohar | .................. | H04L 49/25 370/540 |
| 9,191,273 B2* | 11/2015 | Kleineberg | ............. | H04L 41/12 |
| 9,344,385 B2* | 5/2016 | Ekanayake | ............. | H04L 12/50 |
| 9,426,094 B2* | 8/2016 | Armbruster | ............. | H04L 49/30 |
| 9,843,538 B2* | 12/2017 | Woodruff | .............. | H04J 3/0697 |
| 2001/0052084 A1 | 12/2001 | Huang et al. | | |
| 2006/0039338 A1 | 2/2006 | Kwon et al. | | |
| 2006/0250947 A1 | 11/2006 | Allen | | |
| 2007/0025240 A1* | 2/2007 | Snide | ................ | H04L 12/40169 370/217 |
| 2008/0062864 A1 | 3/2008 | Balasubramanian | | |
| 2008/0126572 A1* | 5/2008 | Holt | .................... | H04L 49/1515 709/252 |
| 2008/0298261 A1 | 12/2008 | Rittmeyer et al. | | |
| 2009/0116405 A1* | 5/2009 | Hakala-Ranta | ......... | H04L 12/42 370/254 |
| 2010/0303067 A1 | 12/2010 | Manohar et al. | | |
| 2013/0114400 A1* | 5/2013 | Zhang | .................... | H04L 45/18 370/224 |
| 2014/0126352 A1 | 5/2014 | Tatsumi et al. | | |
| 2014/0185427 A1* | 7/2014 | Ditzel, III | ............. | H04L 12/437 370/223 |

OTHER PUBLICATIONS

First Office Action for Chinese Patent Application No. 201510075356.6 dated Mar. 8, 2019.
Notice of Reason for Rejection for Japanese Patent Application No. 2015-022995 dated Feb. 12, 2019.
Office Action for Japanese Patent Application No. 2019-148431, dated Aug. 21, 2020.

* cited by examiner

COMMUNICATION NETWORK HOPPING ARCHITECTURE

CROSS REFERENCE TO RELATED APPLICATIONS

The present application is a continuation under 35 U.S.C. § 120 of U.S. Non-Provisional application Ser. No. 15/586,410 (U.S. Pat. No. 10,313,273), filed May 4, 2017, which is a continuation of U.S. Non-Provisional application Ser. No. 14/449,722 (U.S. Pat. No. 9,647,961), filed Aug. 1, 2014, which claims the benefit under 35 U.S.C. § 119(e) of U.S. Provisional Application Ser. No. 61/940,089, filed Feb. 14, 2014. U.S. Provisional Application Ser. No. 61/940,089 is hereby incorporated by reference in its entirety.

BACKGROUND

Communication networks are instrumental in the distribution and processing of information, including process control data. For example, industrial control systems (ICS), which may include process control systems (PCS), distributed control systems (DCS), programmable logic controller (PLC)-based systems supervisory control and data acquisition (SCADA) systems, and the like utilize communication networks to facilitate the production of goods and provision of essential services. Such communication networks may utilize Ethernet topologies in the dissemination of data throughout various portions of the network. The Ethernet topology can act as an information-processing junction between a remote data source and one or more local devices.

SUMMARY

Implementations of a communication network system are disclosed. In one or more implementations, the communication network system includes a plurality of network devices. Each of the plurality of network devices incorporates one or more multi-port switches, where each multi-port switch includes a connection to the network device incorporating the multi-port switch and a connection to at least one other port of another multi-port switch incorporated by another respective one of the plurality of network devices.

In one or more implementations, the communication network system includes a first network device including two multi-port switches. The communication network system also includes one or more intermediary network devices arranged in parallel with respect to the first network device. Respective ones of the one or more intermediary network devices include two multi-port switches, where one of the one or more intermediary network devices are communicatively coupled to the first network device via one multi-port switch of the intermediary network device and one multi-port switch of the first network device. The communication network system further includes a second network device including two multi-port switches. The second network device is arranged in parallel with respect to the one or more intermediary network devices. The second network device is communicatively coupled to one of the one or more intermediary network devices via one multi-port switch of the intermediary network device and one multi-port switch of the second network device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
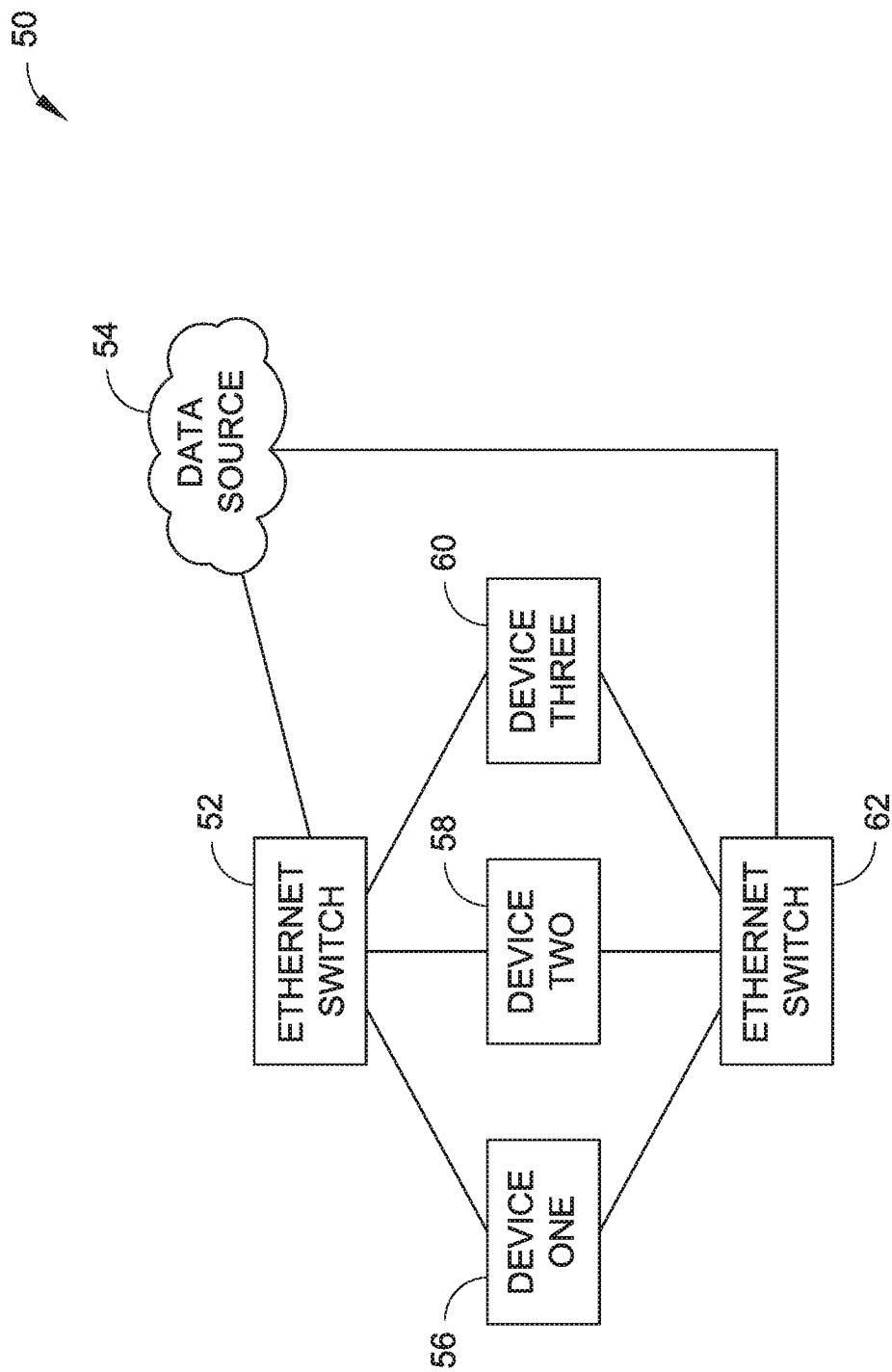
FIG. 1 is a conceptual block diagram illustrating an Ethernet communication network.

The sources of data relative to one or more devices in a network can span relatively large distances. Theoretically, each device could have a direct connection to the source of data, however, such independent connections are generally cost prohibitive. Rather than independently link each user device in the network to the data source with a separate/independent linkage, a switch (e.g., an Ethernet switch) can be utilized to connect the source of data with the one or more devices. For instance, as shown in FIG. 1, an example communication network 50 is shown having an Ethernet switch 52 communicatively coupled between a data source 54 and three devices 56, 58, 60 in a network (illustrated as Device one, Device two, and Device three, respectively). A redundant Ethernet switch 62 may similarly be communicatively coupled between the data source 54 and the three devices 56, 58, 60, though not in direct communication with the Ethernet Switch 52. The redundant Ethernet switch 62 can provide network connectivity to each of the devices 56, 58, 60 should the Ethernet Switch 52 experience a failure, such as a power failure, a connectivity failure, a mechanical failure, and the like. Similarly, the Ethernet switch 52 can provide network connectivity to each of the devices 56, 58, 60 should the redundant Ethernet Switch 62 experience a failure. However, such a configuration leads to a dependence on the devices to the functionality of each Ethernet switch. Moreover, the Ethernet switches may not be optimized for their network functionality, such as by providing more ports than necessary, resulting in an inefficient use of the switches and the resources needed to provide the switches.

Accordingly, communication network architectures are disclosed that employ one or more multi-port network switches within each device of a plurality of devices of the network, where a switch of a device is communicatively coupled with another switch of another device of the network. Additionally, a multi-port network switch of a device can be communicatively coupled to a redundant switch of the same device. At least one switch of a device of the network is connected to a data source and/or data receiver (e.g., a control point, a router, a cloud, and so forth). For instance, a multi-port switch and/or a redundant multi-port switch of the same device may be connected to the data source/receiver. In one or more implementations, the multi-port network switches include three ports. In other implementations, the multi-port network switches include four ports. Accordingly, the disclosed communication network architectures may provide a network hopping architecture that provides efficient usage of each port of the multi-port network switches. For example, where the multi-port network switches are Ethernet switches, such communication network architectures may provide a hopping Ethernet architecture. Further, the disclosed communication network architectures may not depend on the functionality of one or two network switches connected to each of the devices, rather, each of the distributed network switches can utilize the infrastructure/resources (e.g., power) of the device supporting the switch, which can provide a robust communication network architecture.

Example Communication Network(s)

Figure 2:
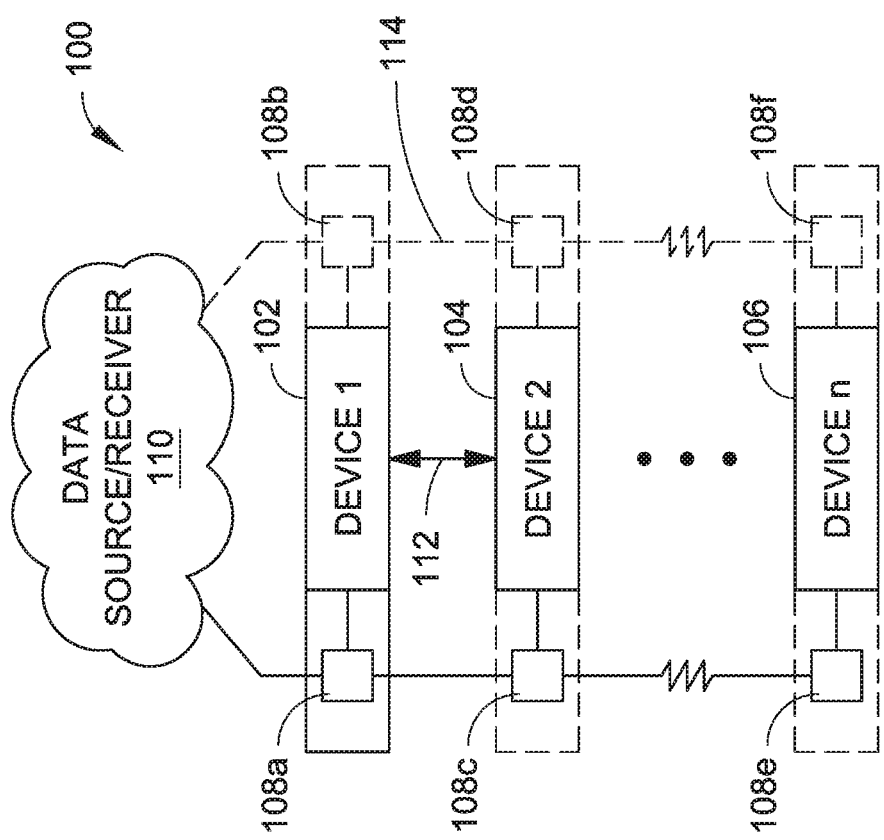
FIG. 2 is a conceptual block diagram illustrating a communication network architecture in accordance with an example implementation of the present disclosure.

Referring to FIG. 2, an example communication network architecture 100 is described in accordance with one or more example implementations of the present disclosure. As shown, the communication network architecture 100 includes a plurality of network devices 102, 104, 106 (illustrated as Device 1, Device 2, and Device n, respectively). In implementations, the devices 102, 104, and 106 are physically distributed modules (e.g., distinct modules). While three devices are illustrated, the plurality of devices can include any number of devices, where "n" refers to the final device of the plurality of devices. Further, the second device and Device "n" could be the same device, such that the communication network architecture 100 includes two devices. The devices 102, 104, 106 can include any device configured for network communication and operation. For example, the devices 102, 104, 106 can be a control module, an input/output (I/O) module, a power module, and so forth, such as incorporated in an industrial control system (ICS) (e.g., a secure industrial control system). The term "industrial control system" as used herein may encompass several types of control systems used in industrial production, including process control systems (PCS), supervisory control and data acquisition (SCADA) systems, distributed control systems (DCS), and other smaller control system configurations such as programmable logic controllers (PLC) often found in the industrial sectors and critical infrastructures. The devices 102, 104, 106 can be incorporated by an industrial control system to be implemented in a variety of industries, such as electrical, water, oil, gas, data, and so forth. In implementations, based on information received from remote stations, automated or operator-driven supervisory commands can be transmitted to the devices 102, 104, 106 (which may include remote station control devices, field devices, and the like) of an industrial control system. For example, the devices 102, 104, 106 as part of an industrial control system can control local operations such as opening and closing valves and breakers, collecting data from sensor systems, monitoring the local environment for alarm conditions, and performing other tasks germane to the design of the system.

SCADA systems can be used with industrial processes, including manufacturing, production, power generation, fabrication, and refining. SCADA system can also be used with infrastructure processes, including water treatment and distribution, wastewater collection and treatment, oil and gas pipelines, electrical power transmission and distribution, wind farms, large communication systems, and so forth. Further, SCADA systems can be used in facility processes for buildings, airports, ships, space stations, and the like (e.g., to monitor and control Heating, Ventilation, and Air Conditioning (HVAC) equipment and energy consumption). DCS systems are generally used in large campus industrial process plants, such as oil and gas, refining, chemical, pharmaceutical, food and beverage, water and wastewater, pulp and paper, utility power, mining, metals, and so forth. PLCs are typically used in industrial sectors and with critical infrastructures.

Figure 3:
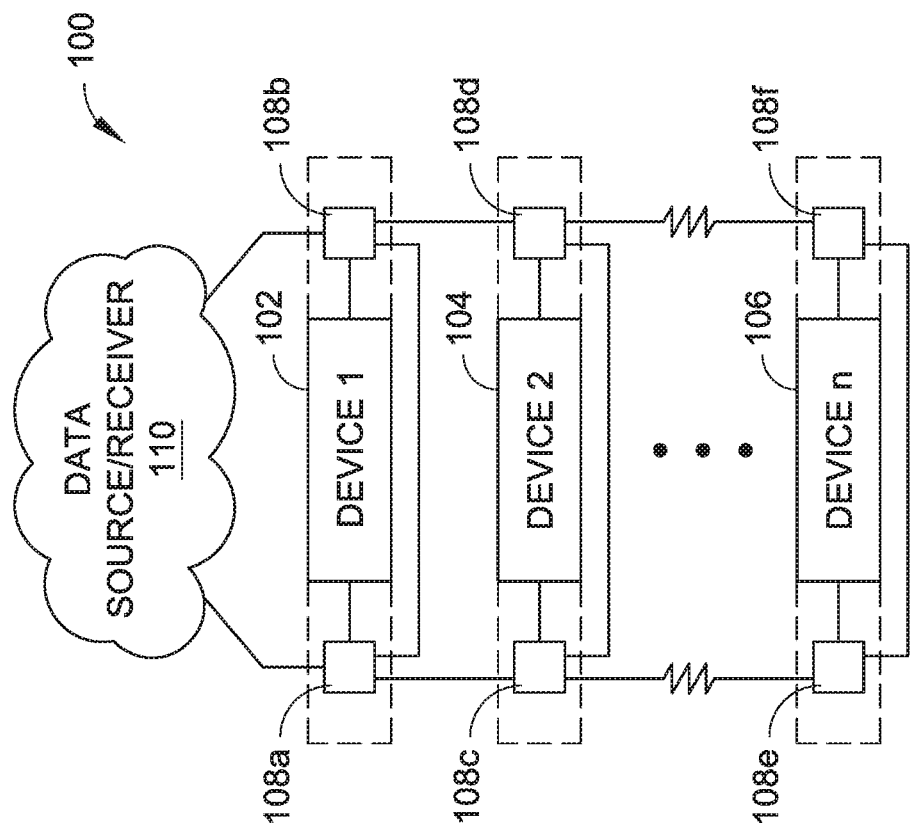
FIG. 3 is a conceptual block diagram illustrating another communication network architecture in accordance with an example implementation of the present disclosure.

In embodiments, each device (e.g., devices 102, 104, 106) includes one or more (e.g., one switch, two switches, three switches, and so forth) integrated multi-port switches 108 (e.g., multi-port switch chips) configured to route data to/from a data source/receiver 110 and/or between the devices. As shown in FIGS. 2 and 3, when a second multi-port switch is integrated by a particular device, the multi-port switches 108 of that device may provide redundant connections to facilitate robustness. The data source/receiver 110 can be a control point, a node, a router, a cloud, and so forth, configured to furnish or receive data (e.g., a command prompt, data request, etc.) to/from one or more of the devices 102, 104, 106. In implementations, each port of the multi-port switches 108 integrated in the devices 102, 104, 106 includes a connection to a portion of the device (e.g., to a processing module, a power module, an I/O module, and so forth) that integrates the multi-port switch 108 and to one other port of another multi-port switch 108 in another device. One or more of the multi-port switches 108 can be a minimal propagation switch chip, such that the switch is configured to recognize that a data packet is not destined for the device integrating the switch, and to subsequently forward that data packet to another switch.

The connections of each multi-port switch may differ depending on the device which integrates the switch. For instance, the devices may be designated as an initial switch (i.e., a switch connected between the data source/receiver 110 and an intermediary switch), an intermediary switch (i.e., a switch connected between an initial switch and another intermediary switch, a switch connected between an initial switch and a terminal switch, a switch connected between two intermediary switches, or a switch connected between another intermediary switch and a terminal switch), or a terminal switch (i.e., the switches of the final device of the plurality of devices with respect to the data source/receiver 110). In implementations, the multi-port switches 108 designated as initial switches and as intermediary switches are three-port switches, whereas the terminal switches are two-port switches. One port of each switch is configured as a connection to a portion of the device (e.g., to a processing module, a power module, an I/O module, and so forth) that integrates the multi-port switch 108. One or more ports are configured as a connection to another switch on another device. As shown in FIG. 2, the switches of device 1 (e.g., switches 108a and/or 108b) may be designated as initial switches, since each switch includes a connection to the data source/receiver 110 and a switch of an intermediary switch (i.e., switch 108a includes a connection to switch 108c of device 2, and switch 108b, when present, includes a connection to switch 108d, when present, of device 2). The switches of device 2 (e.g., switches 108c and/or 108d) may be designated as intermediary switches, since each switch includes a connection to an initial switch (i.e., switch 108c includes a connection to switch 108a of device 1, and switch 108d, when present, includes a connection to switch 108b, when present, of device 1) and a connection to a switch of device n or to a switch of another device, depending on whether device n is third (and terminal) device or a subsequent (and intermediary) device. For example, if intervening devices are present between device 2 and device n, then the switch(es) of device 2 would include connections between the initial switch(es) of device 1 (described above) and intermediary switch(es) of an intervening device. If no devices intervene between device 2 and device n, then each switch of device 2 includes a connection to the initial switch(es) of device 1 (described above) and a connection to a terminal switch (i.e., switch 108c includes a connection to switch 108e of device n, and switch 108d, when present, includes a connection to switch 108f, when present, of device n). The switches of device n (e.g., switches 108e and/or 108f) may be configured as two-port switches, designated as terminal switches, since each switch includes one connection to another switch on another device (i.e., switch 108e includes a connection to switch 108c of device 2 if no intermediary switches are present, or a connection to the switch of an intermediary switch, and switch 108f, when present, includes a connection to switch 108d, when present, of device 2 if no intermediary switches are present, or a connection to the switch of an intermediary switch), and one connection between the integrated switch and the device that integrates the switch.

In implementations, the devices 102, 104, 106 may include an interlink (e.g., a dedicated private interlink) between the devices a form (e.g., another form of redundancy where multiple multi-port switches are integrated by each device) of redundancy between the devices. For example, as shown in FIG. 2, device 1 (102) and device 2 (104) include an interlink 112 as a dedicated connection between the devices. In embodiments, one or more of the interlink 112 and a connection between multi-port switches 108 between two devices (shown as 114) is implemented as a public interlink to provide distributed redundancy to the communication network architecture 100.

In implementations, the multi-port switches 108 designated as initial switches and as intermediary switches are four-port switches, whereas the terminal switches are three-port switches. Similar to the implementations with the three-port and two-port switches, one port of each switch is configured as a connection to a portion of the device (e.g., to a processing module, a power module, an I/O module, and so forth) that integrates the multi-port switch 108. One or more ports are configured as a connection to another switch on another device. Additionally, one port is configured as a connection to another (e.g., redundant) switch integrated by the same device. Referring to FIG. 3, an example communication network architecture 100 is described in accordance with one or more example implementations of the present disclosure, where the switches 108 are configured as four-port or three-port switches. The connectivity of the switches is similar to the architecture provided in FIG. 2 with redundant switches, however, each switch in FIG. 3 includes one additional connection. As shown, switches 108a and 108b are four-port switches that include a connection between each other. Switches 108c and 108d are four-port switches that include a connection between each other. Switches 108e and 108f are three-port switches that include a connection between each other. The direct connection between switches integrated by the same device may facilitate robust network connectivity, even when the device experiences interruptions in service.

The connections between switches and devices may provide communicative coupling via communication links to facilitate communication and/or power signal transmission. The devices 102, 104, 106 may be configured as field devices, which may include an input instrument, such as a sensor, which can be used for functions such as measuring pressure in piping for a gas plant, a refinery, and so forth. In such instances, input modules of the device input/output modules can be used to receive information from input instruments, such as the sensor, in the process or the field. The input/output modules may be configured to convert analog data received from the sensor of the field device to digital data (e.g., using Analog-to-Digital Converter (ADC) circuitry, and so forth). The devices may include power modules configured to supply electrical power to the field devices, such as via input/output modules.

The input/output modules of the devices, when configured as output modules, can be used to transmit instructions to output instruments of the field devices. For example, the field devices may include an output instrument, such as a motor. In such implementations, the input/output modules may be connected to the motor and configured to control one or more operating characteristics of the motor, such as motor speed, motor torque, and so forth. Further, the input/output modules may be configured to convert digital data to analog data for transmission to the motor (e.g., using Digital-to-Analog (DAC) circuitry, and so forth). In embodiments, one or more of the input/output modules may include a communications module configured for communicating via a communications sub-bus, such as an Ethernet bus, an H1 field bus, a Process Field Bus (PROFIBUS), a Highway Addressable Remote Transducer (HART) bus, a Modbus, and so forth. For example, the switches 108 may be configured as two-port Ethernet switch chips, three-port Ethernet switch chips, or four-port Ethernet switch chips, depending on the communication network architecture.

The devices 102, 104, 106 may include input/output modules configured to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

The switches 108 include multiple ports that furnish a physical connection to hardware and circuitry included with the devices 102, 104, 106, such as a printed circuit board (PCB), and so forth. The devices 102, 104, 106 may also include an interface for connecting to other networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. The devices 102, 104, 106 may further include a connection for connecting the devices 102, 104, 106 to a computer bus, and so forth.

Data transmitted between communication connections (e.g., connections between the multi-port switches 108) may be packetized (e.g., discrete portions of the data may be converted into data packets comprising the data portions along with network control information, and so forth). The communication network may use one or more protocols for data transmission, including a bit-oriented synchronous data link layer protocol such as High-Level Data Link Control (HDLC). In embodiments, the communication network and/or the communication connections may implement HDLC according to an International Organization for Standardization (ISO) 13239 standard, or the like. However, it should be noted that HDLC is provided by way of example only and is not meant to be restrictive of the present disclosure. Thus, the communication network may use other various communications protocols in accordance with the present disclosure.

The communication connections (e.g., connections between the multi-port switches 108, connections between the multi-port switches 108 and the devices 102, 104, 106, and so forth) may be configured for exchanging information with components used for monitoring and/or controlling instrumentation, such as one or more control loop feedback mechanisms/controllers. For example, a controller can be configured as a microcontroller/Programmable Logic Controller (PLC), a Proportional-Integral-Derivative (PID) controller, and so forth. One or more of devices 102, 104, 106 may include a network interface for connecting to a controller via a network. In embodiments, the network interface may be configured as a Gigabit Ethernet interface. However, it should be noted that Gigabit Ethernet is provided by way of example only and is not meant to be restrictive of the present disclosure. Thus, the network interface may be configured for connecting the devices 102, 104, 106 to other various networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Additionally, the network interface may be implemented using computer bus. For example, the network interface can include a Peripheral Component Interconnect (PCI) card interface, such as a Mini PCI interface, and so forth. Further, the network may be configured to include a single network or multiple networks across different access points.

The devices 102, 104, 106 may include one or more of the power modules that can include an AC-to-DC (AC/DC) converter for converting Alternating Current (AC) (e.g., as supplied by AC mains, and so forth) to Direct Current (DC) for transmission to a field device, such as a motor (e.g., in an implementation where the motor comprises a DC motor). Two or more power modules can be used to provide redundancy. For example, two power modules can be connected to or implemented in one or more of the devices 102, 104, 106 using a separate (e.g., redundant) power backplane for each power module. In embodiments, the power backplane(s) may be connected to one or more input/output modules using connectors/connector assemblies.

In embodiments, the multi-port switches 108 may be integrated by the devices 102, 104, 106 using a support frame. The support frame may be used to support and/or interconnect communications control modules, power modules, communication connections, power backplane(s), and/or input/output modules. For example, one or more communications modules may be comprised of a circuit board. The circuit board may be mounted to the support frame. Additionally, the connectors may be mounted to the support frame.

Example Processes for Providing Communication Network Hopping Architecture(s)

Figure 4:
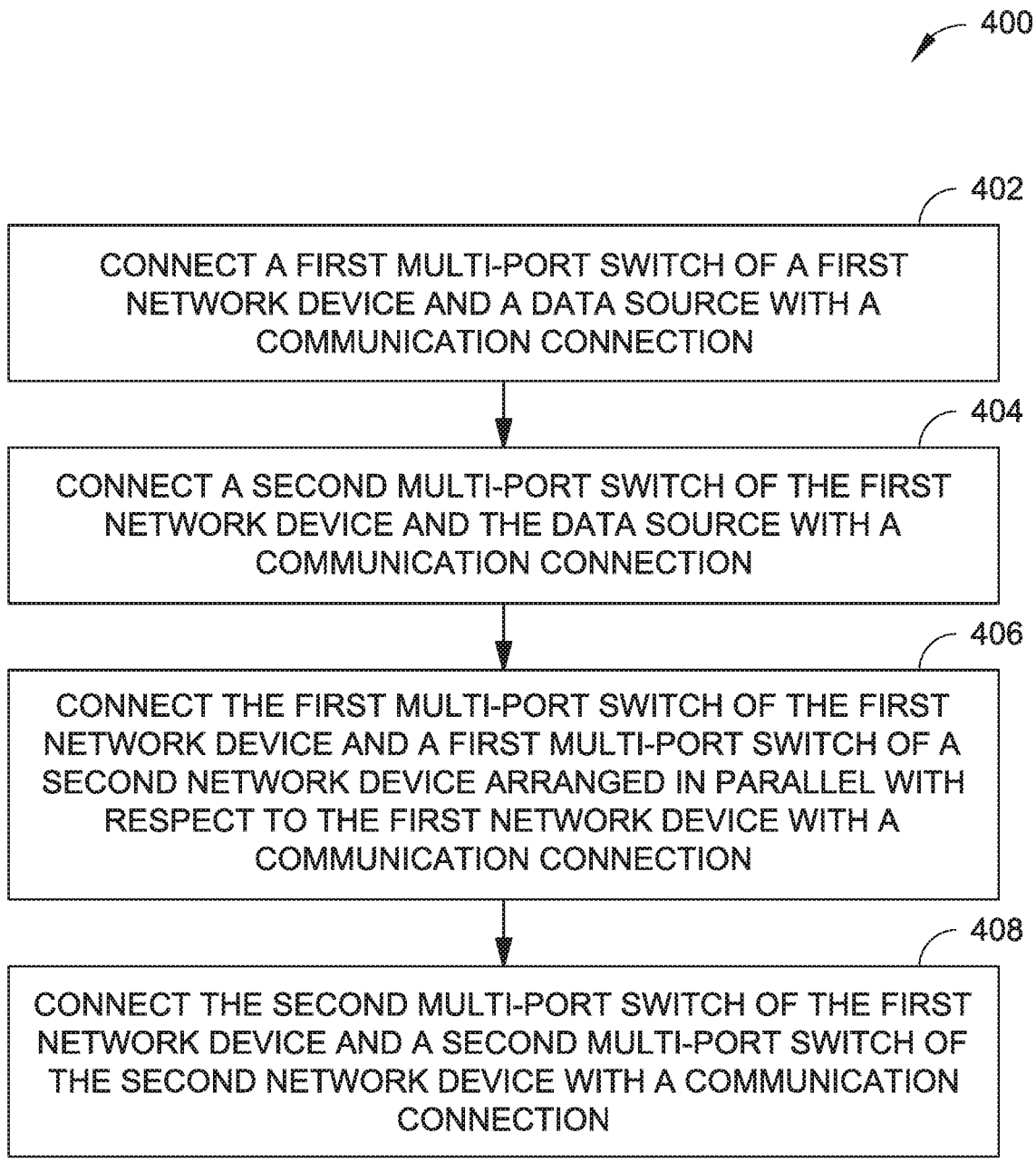
FIG. 4 is a flow diagram illustrating a method for providing a communication network hopping architecture in accordance with an example implementation of the present disclosure.

Referring now to FIG. 4, a process (method) 400 for providing a communication network hopping architecture is described. For example, the communication network hopping architecture may be provided according to communication network architecture 100 described with reference to FIGS. 2 and 3. In implementations, the method 400 includes connecting a first multi-port switch of a first network device and a data source with a communication connection (Block 402). For example, multi-port switch 108a of device 1 is connected to the data source/receiver 110. The method 400 also includes connecting a second multi-port switch of the first network device and the data source with a communication connection (Block 404). For example, multi-port switch 108b of device 1 is connected to the data source/receiver 110. The method 400 further includes connecting the first multi-port switch of a first network device and a first multi-port switch of a second network device arranged in parallel with respect to the first network device with a communication connection (Block 406). For example, multi-port switch 108a of device 1 (102) is connected to multi-port switch 108c of device 2 (104). The method 400 further includes connecting the second multi-port switch of the first network device and a second multi-port switch of the second network device with a communication connection (Block 408). For example, multi-port switch 108b of device 1 (102) is connected to multi-port switch 108d of device 2 (104).

Figure 5:
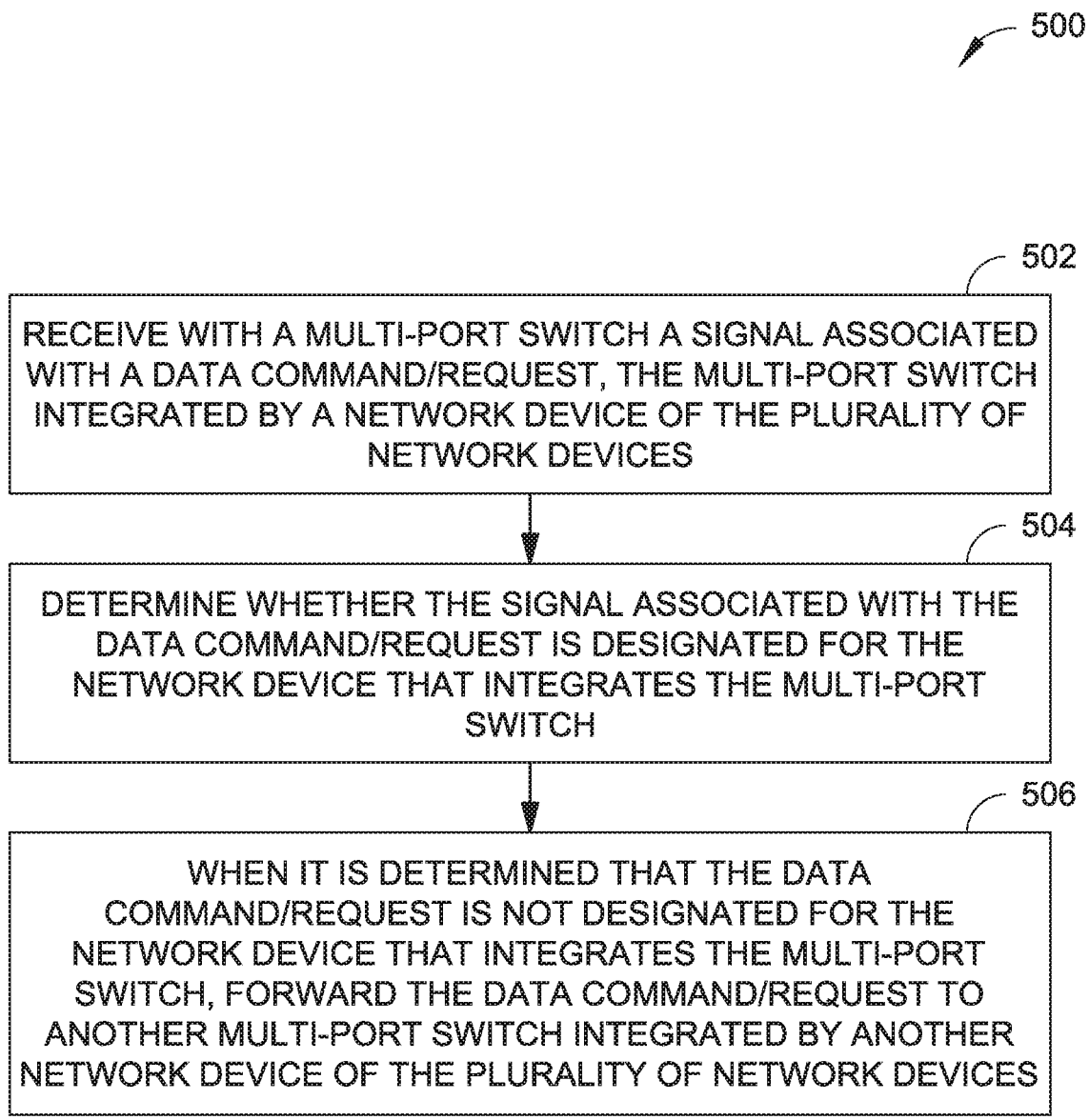
FIG. 5 is a flow diagram illustrating a method of propagating information through a communication network in accordance with an example implementation of the present disclosure.

Referring now to FIG. 5, a process (method) 500 of propagating (e.g., hopping) information through a communication network is shown in accordance with an example implementation. For example, the communication network hopping architecture may be provided according to communication network architecture 100 described with reference to FIGS. 2 and 3. In implementations, the method 500 includes receiving with a multi-port switch a signal associated with a data command/request, the multi-port switch integrated by a network device of the plurality of network devices (Block 502). For example, multi-port switch 108a of device 1 (102) may receive a data request from the data source/receiver 110. The data request may involve data associated with any of the devices 102, 104, 106. The method 500 also includes determining whether the signal associated with the data command/request is designated for the network device that integrates the multi-port switch (Block 504). For example, one or more of the multi-port switches 108 (e.g., multi-port switch 108a) can be a minimal propagation switch chip, such that the switch is configured to recognize that a data packet is not destined for the device integrating the switch, such as through a recognition of the initial bits of the data request. The method 500 further includes, when it is determined that the data command/request is not designated for the network device that integrates the multi-port switch, forwarding the data command/request to another multi-port switch integrated by another network device of the plurality of network devices (Block 506). For example, if multi-port switch 108a determines that the data command/request from the data source/receiver 110 is not designated for device 1 (102), then the multi-port switch 108a forwards the data command/request to multi-port switch 108c of device 2 (104). The pattern of recognition and forwarding (e.g., hopping) may continue throughout a plurality of devices until the data command/request reaches the appropriate device.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system or circuit. Further, elements of the blocks, systems, or circuits may be implemented across multiple integrated circuits. Such integrated circuits may comprise various integrated circuits including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block or circuit may be implemented using its software or firmware equivalent. In other instances, one part of a given system, block or circuit may be implemented in software or firmware, while other parts are implemented in hardware.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A network device, comprising:
a first multi-port switch communicatively coupled to the network device; and
a second multi-port switch communicatively coupled to the network device, the first and second multi-port switches each having at least four or more ports, the first and second multi-port switches directly connected with one another, the first and second multi-port switches including connections for connecting to respective multi-port switches of another network device, wherein the first multi-port switch is configured to connect with a first respective multi-port switch of the other network device, and the second multi-port switch is configured to connect with a second respective multi-port switch of the other network device, the first and second multi-port switches further including connections configured to connect to at least one of a data source or a data receiver.

2. The network device as recited in claim 1, wherein the network device comprises at least one of a processing module, a power module, an input/output module, or a field device.

3. The network device as recited in claim 1, wherein each of the first and second multi-port switches comprises a multi-port Ethernet switch chip.

4. A network device, comprising:
a first multi-port switch; and
a second multi-port switch, the first and second multi-port switches including connections for connecting to respective multi-port switches of a plurality of network devices, the first and second multi-port switches separately connected with one another, the plurality of network devices including at least a first network device and a second network device, wherein the first multi-port switch is configured to connect with the first network device and with a first respective multi-port switch of the second network device, and the second multi-port switch is configured to connect with the first network device and with a second respective multi-port switch of the second network device, each of the first and second multi-port switches being a four-port switch.

5. The network device as recited in claim 4, wherein the network device comprises at least one of a processing module, a power module, an input/output module, or a field device.

6. The network device as recited in claim 4, wherein each of the first and second multi-port switches comprises a multi-port Ethernet switch chip.

7. A network device, comprising:
a first multi-port switch communicatively coupled to the network device; and
a second multi-port switch communicatively coupled to the network device, the first and second multi-port switches each having at least four or more ports, the first and second multi-port switches directly connected with one another, the first and second multi-port switches including connections for connecting to respective multi-port switches of a first network device, wherein the first multi-port switch is configured to connect with a first respective multi-port switch of the first network device, and the second multi-port switch is configured to connect with a second respective multi-port switch of the first network device, the first and second multi-port switches including connections for connecting to respective multi-port switches of a second network device, wherein the first multi-port switch is configured to connect with a first respective multi-port switch of the second network device, and the second multi-port switch is configured to connect with a second respective multi-port switch of the second network device.

8. The network device as recited in claim 7, wherein the network device comprises at least one of a processing module, a power module, an input/output module, or a field device.

9. The network device as recited in claim 7, wherein each of the first and second multi-port switches comprises a multi-port Ethernet switch chip.

* * * * *